Figure 1:
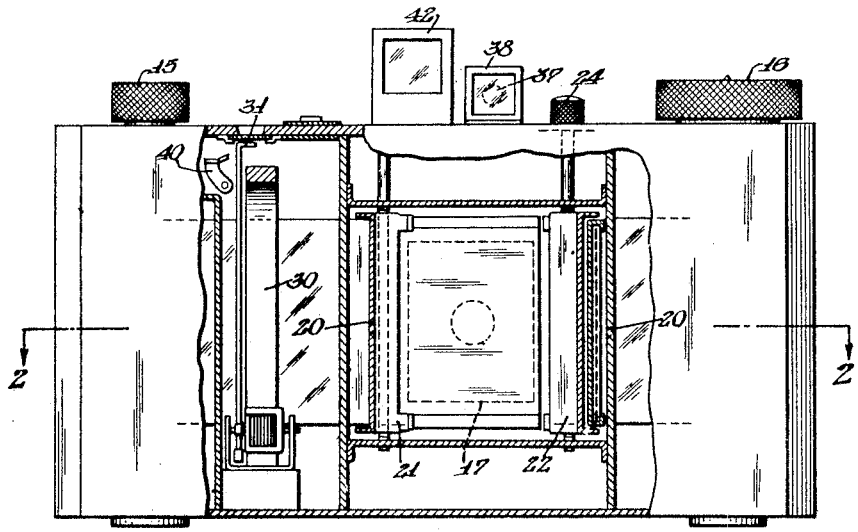

INVENTOR.
Joseph M. Bing
BY
ATTORNEY

Nov. 17, 1942.   J. M. BING   2,302,597
CAMERA WITH BUILT-IN PHOTOELECTRIC EXPOSURE METER
Original Filed June 24, 1941   2 Sheets-Sheet 2
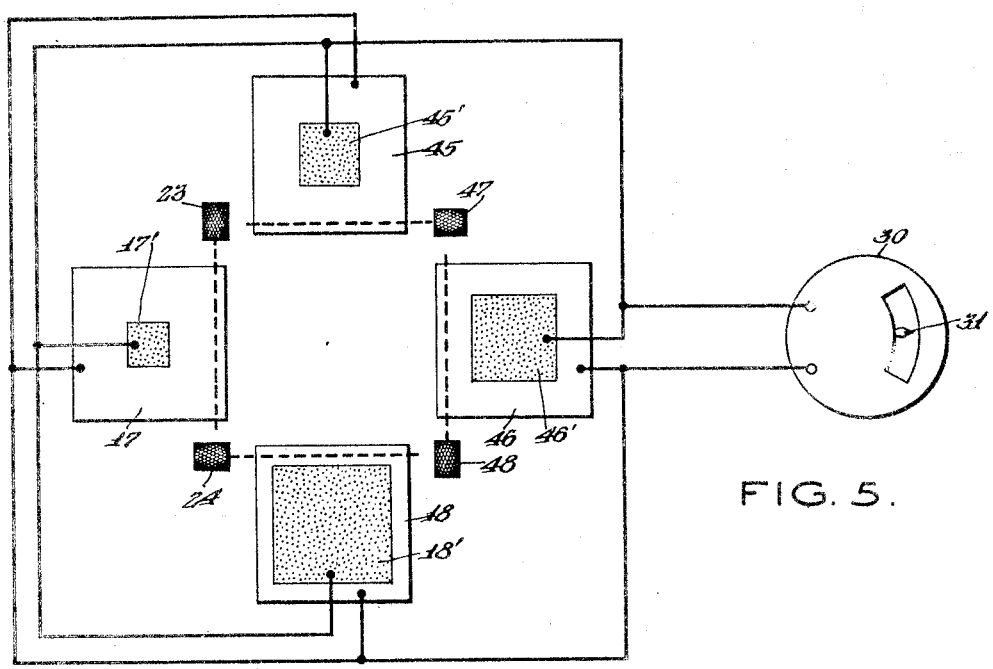
FIG. 5.
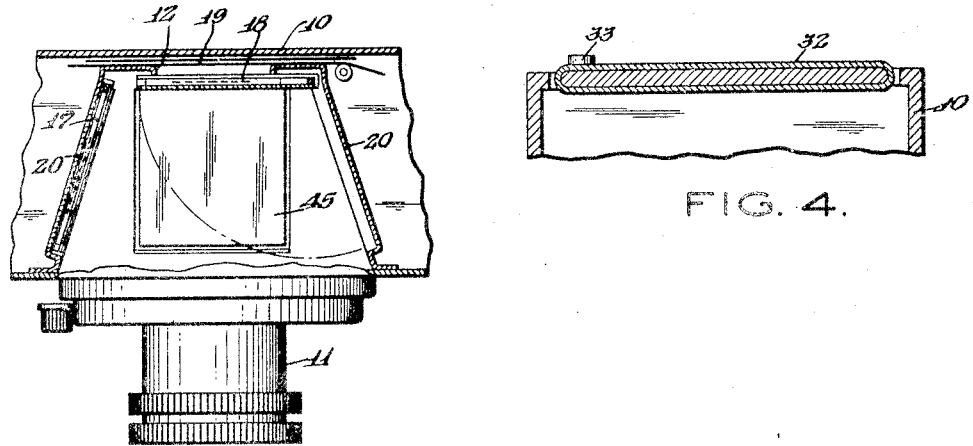
FIG. 6.
FIG. 4.
INVENTOR.
Joseph M. Bing
ATTORNEY Patented Nov. 17, 1942

2,302,597

UNITED STATES PATENT OFFICE 2,302,597

CAMERA WITH BUILT-IN PHOTOELECTRIC EXPOSURE METER

Joseph M. Bing, New York, N. Y.

Original application June 24, 1941, Serial No. 347,261. Divided and this application December 29, 1941, Serial No. 424,722

9 Claims. (Cl. 95—10)

The present invention is a division carved out from application Serial No. 347,261, filed June 24, 1941, entitled Photometric devices, and has for its main object the provision of a photographic exposure meter structurally embodied or permanently built in a photographic camera.

A more specific object of the invention is to provide a camera-exposure meter combination, wherein the meter will be normally in a position so as not to interfere with the proper function of the camera and may be adjusted instantly to its operative position whenever an exposure determination is required.

Another object is to provide a camera-exposure meter combination, wherein the meter in the operative position is affected substantially by the same light rays emanating from an object or scene to be photographed as reproduced by the lens upon the plate or film in the camera in the picture taking position.

A further object is the provision of a photoelectric exposure meter built in a camera which will permit of a light measurement or exposure determination in response to light rays emanating from a limited fractional area of the object or scene to be photographed being of major pictorial interest in the final print and which accordingly, it is desired, to expose correctly in preference to the remaining parts of the object or scene, while allowing the latter to be sufficiently rendered due to the exposure latitude of the sensitive emulsion of the plate or film used in the camera.

Still a further object is to provide an exposure meter built in a photographic camera which will permit of selectively measuring either the average or integrated brightness value of an entire photographic scene or object reproduced upon the plate or film if all parts of the scene or object are of substantially equal pictorial value, such as in landscape or architectural views, or the brightness of a limited fractional portion of a scene, such as the head of a person in portrait photography being of major pictorial interest compared with the other parts (background, etc.) of the scene. In other words, the invention purports to provide a meter capable of rendering due justice in the exposure determination to the composition or pictorial value to be obtained in the final print.

Another object is to provide a camera-exposure meter combination comprising a plurality of photoelectric cells having varying characteristics, said cells normally, i. e. in the ineffective or non-use position, being stored or mounted within the camera so as not to interfere with the proper function of the camera, while each individual cell may be selectively adjusted to its operative position in the path of the light bundle entering through the lens of the camera to adapt the light measurement to various pictorial as well as technical picture taking requirements and conditions.

Figure 2:
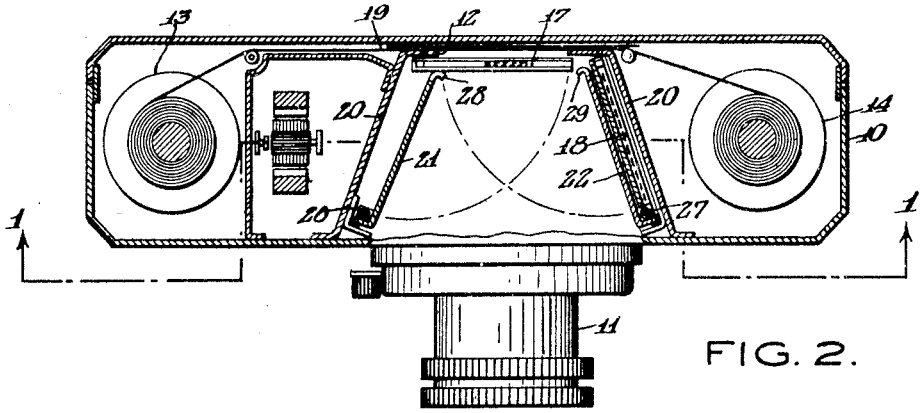
Figure 3:
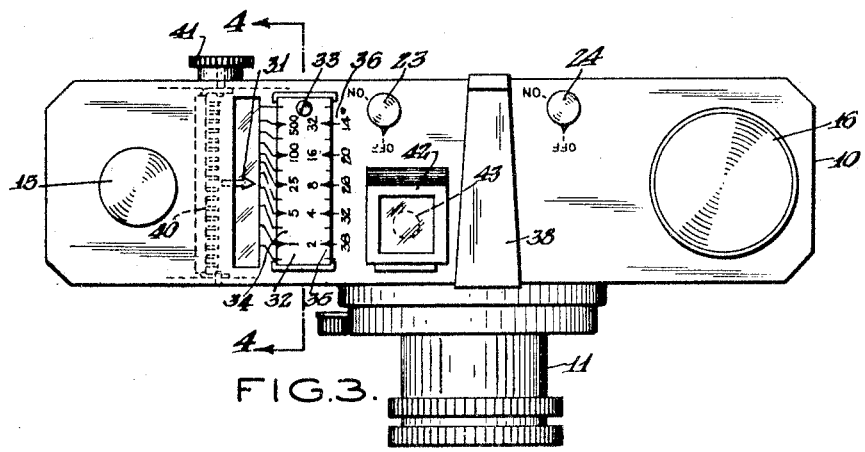

The above and further objects and advantages of the invention will become more apparent from the following detailed description taken with reference to the accompanying drawings forming part of this specification and wherein:

Figure 1 is a vertical cross-sectional view of a camera and exposure meter structurally combined therewith embodying the principles of the invention; Figure 2 is a horizontal cross-section taken on line 2—2 of Figure 1; Figure 3 is a top view of Figure 1; Figure 4 is a partial sectional view taken on line 4—4 of Figure 3; Figure 5 is a wiring diagram showing the connection of the photoelectric cells and indicating instrument; and Figure 6 is a partial cross-section similar to Figure 2 illustrating a modification of the invention.

Like reference numerals identify like parts in the different views of the drawings.

With the above objects in view, the present invention involves in general the permanent mounting in or combination with a photographic camera of one or more photoelectric cells having different characteristics such as sensitivity or effective area, operating range, spectral response sensitivity, etc., in such a manner that the cells, when not in use, are concealed or protected so as not to interfere with the function of the camera, while enabling the adjustment of any of the cells to its operative position in the path of the light bundle entering the lens in the picture taking position of the camera for carrying out a light measurement or exposure determination to suit various exposure conditions and picture taking as well as pictorial requirements.

Referring to Figures 1 to 3, I have shown a novel photoelectric cell mount structurally embodied in a photographic camera in accordance with my invention. In the embodiment shown, one or more photoelectric cells which are preferably of the self-generating or photo-voltaic type described in my above-mentioned co-pending application, are hingedly secured to the walls of the light chamber connecting the lens of the camera with the picture frame or negative carrier in such a manner that the cells are protected and fully concealed in the ineffective or non-use position so as not to interfere with the proper function of the camera, while being adapted to be instantly moved into operative or measuring position in front of the film gate or picture frame of the camera.

Arrangements of this type, among other beneficial results and novel effects, have the advantage that the photoelectric cell is excited by exactly the same amount and type of light that emanates from the scene or object to be photographed in substantially the same manner as the film or plate in the camera, thus dispensing substantially with a special light baffle or other means to confine the view angle required in photoelectric exposure meters forming a separate unit and used independently of the camera. Furthermore, the cell receiving the light through the same lens which passes it subsequently onto the sensitive emulsion will register the same effect with regard to the very same quality and quantity of light as reaches the emulsion and accordingly will be free from variations and discrepancies resulting from different transmission characteristics of different lenses, such as absorption, refraction and obstruction of the passage to certain wave lengths, especially in the very actinic ultraviolet region.

The camera which, in the example illustrated, is of the miniature type but which may be of any other construction, comprises a casing or body 10, an objective or lens mount 11 and a frustro-pyramidal light chamber 20 connecting the lens located at the base with the picture frame or film gate 12 located at the apex of the chamber 20 at the rear end of the camera body. Items 13 and 14 indicate the supply and take-up film spools and numerals 15 and 16 represent the winding and rewinding knobs for moving the film 19 past the film gate 12 in the manner well understood by those skilled in the art.

A plurality of photoelectric cells, in the example shown two cells 17 and 18, mounted in suitable holders as shown in the parent application are hingedly secured to a pair of opposite walls, in the example shown the vertical walls, of the chamber 20, so as to lie against said walls in the ineffective or non-use position and are fully concealed and protected by shields or covers 21 and 22, respectively, and adapted to be swung to and from their operative position in front of the film gate 12 for carrying out a light measurement or exposure determination.

The cells are preferably of the dry or photovoltaic type which operate without an outside stimulation or biasing voltage as described in detail in the above-mentioned co-pending application. The covers 21 and 22 are also hingedly mounted upon the walls of the chamber 20 opposite to the pivots or hinges of the respective photoelectric cells and the distance between the hinges of the covers and cells is slightly greater than the distances the cells and covers extend from their hinges.

The covers 21 and 22 are urged against the cells by the provision of suitable springs 26 and 27, respectively, or by any other suitable means. When either of the cells is swung from the ineffective to the operating position, as shown for the cell 17 in Figure 2, the cover at first rides on one side of the cell holder, when the cell holder is first swung toward the operative position and will then ride on the other side of the holder after the free edge of the cell holder has passed the free edge of the cover. The latter will return to its starting position due to the action of the springs 26 and 27 in such a manner that the free end of the cover rests against the holder of the cell in the operative position and acts as a stop or abutment for the latter as clearly shown in Figure 2.

The adjustment of the cells is suitably effected from the outside of the camera by the aid of suitable adjusting members such as knurled knobs 23 and 24, respectively, suitable identifying marks being provided to indicate the on- or off-positions. The shafts for the cell holders are passed through the walls of the camera casing in such a manner as to prevent extraneous light from leaking into the camera light chamber by the provision of suitable light traps in the form of flanges engaging corresponding annular recesses in the openings passing the shafts of the cells in a manner well understood.

Item 30 represents a microammeter suitably built in the camera body such as between the film spool 13 and the chamber 20 as shown in the example illustrated and having a needle or pointer 31 the outer end of which bent at a right angle is visible through an opening or window in the top surface of the camera body. Whenever it is desired to carry out a light measurement, one of the cells is swung into operative position by turning the respective knob 23 or 24 to the on-position, thereby causing excitation of the respective photoelectric cell by holding the camera in the picture taking position so as to view the scene or object to be photographed. Hence the pointer 31 will be deflected proportionally to the existing scene or object brightness.

The deflection of the pointer or brightness indication is evaluated or converted, either by a separate manipulation or by semi-automatic arrangement, into the proper terms of exposure for the camera. Thus, the deflection of the pointer 31 may be utilized to directly automatically set or adjust an exposure control organ in any of the known automatic exposure control devices, or the pointer may be arranged to cooperate with a computer for translating the brightness value indication into proper camera exposure values. Such a computer may be of any suitable construction known.

There is thus provided by the invention an arrangement, wherein a plurality of photoelectric cells may be mounted in a camera to take into account various picture taking requirements or exposure determining conditions such as different emulsion speeds, light of different quality such as color in two- or three-color photography and various other exposure controlling factors. In Figure 3, the computer shown comprises a movable scale member 32 having applied thereto adjacent lens aperture and exposure time scales 34 and 35, respectively, and having the form of an endless strip slidably passing through slots in the top wall of the camera casing and provided with an adjusting or setting knob 33. A special emulsion speed scale 36 is provided, in the exemplification shown in Figure 3, applied to the top surface of the camera. In an arrangement of this type the photoelectric cell 17 or 18, or any additional cells that may be mounted upon the remaining walls of the chamber 20, may serve for a special purpose shown in the drawings and described in the following:

The photoelectric cell 12, in the example shown, has a relatively small effective area preferably of circular shape as indicated in dotted lines in the drawings. Accordingly therefore, if the cell is placed in its operative position as shown in front of the film gate or picture frame, only a limited area of the image produced by the lens will excite the cell and in turn determine the brightness measured. This limited area of the image field exciting the photoelectric cell is suitably identified in the finder of the camera such as by a differently coated area or circle 37 in the eye level type finder 38 as shown in Figure 1. In this manner it is possible to operate the photoelectric cell by light rays emanating from the desired limited area of the entire object field which is of major pictorial interest and should be correctly exposed in preference to the remaining portions of the scene of lesser pictorial value in the final print. To this end, in operation, the camera is held in the picture taking position, i. e. at eye level when using a finder of the type shown at 38 with the field 37 in the finder directed so as to cover the object portion of main pictorial interest such as the head of a person in portrait photography, whereby the exposure obtained from the meter deflection will do full justice to the part of the scene to be reproduced preferentially in its tonal values, while allowing the remaining portions of the scene such as the background to be rendered sufficiently due to the latitude of the emulsion of the plate or film used in the camera.

When using an eye level finder as shown in the drawings, the meter may be mounted in such a manner that the end of the pointer or needle 31 of the microammeter is visible in the finder, or a suitable entrapping device 40 in the form of a comb having an adjusting knob 41 may be provided to arrest the pointer in the deflected position at the instant of the measurement so as to allow proper reading after the camera has been withdrawn from the viewing position. Alternately, a reflecting view finder 42 may be provided singly or in addition to the finder 38 having a suitably marked area 43 similar to that in the finder 38, whereby the needle may be viewed in the same direction by a single observation and the proper exposure time directly ascertained without the entrapping member 40, provided the scale member 32 has been previously set by the aid of adjusting knob 33 so that a chosen lens aperture on scale 35 will be opposite to the emulsion speed number on scale 36 corresponding to the plate or film used in the camera.

In order to obtain a correct measurement or exposure for scenes wherein substantially all parts are of more or less equal pictorial value, such as a landscape or architectural photography, there is employed in the example illustrated the second photoelectric cell 18 which has a sensitive area as identified by dotted lines covering substantially the entire picture field reproduced by the lens of the camera. Hence, the brightness measured in this case will represent the average or integrated value of the brightness of all the different parts of the scene which average value, in this case, is determinative of the proper exposure to be given. In order to take into consideration the difference in operating range due to the different effective areas of the cells 17 and 18, either a plurality of scales may be provided on the computer or a neutral density filter may be placed in front of the larger cell 18 to limit the amount of the impinging light and to equalize the operating ranges of the cell.

In the foregoing, the photoelectric cells have been shown and described in combination with non-reflecting shields or covers elements to protect the cells in the non-use or ineffective position and to prevent undesirable light reflections. In a simplified embodiment of the invention the cover elements are omitted and the cells protected against lateral light rays by mounting same so as to nest within suitable recesses in the walls of the light chamber 20. In this case the rear surface of the cells is coated with a suitable non-reflecting substance or paint. An arrangement of this type is shown in Figure 6 which comprises only the hingedly mounted cells 17, 18 and 45 mounted upon different walls of the light chamber, cell 18 being shown in the operative position. As is seen, the cells are accommodated in the ineffective or non-use position within depressions or recesses in the walls of the chamber 20 and may be swung to and from their operative position by the aid of adjusting members operated from the outside of the camera in substantially the same manner as described hereinbefore. In order to fix the on- and off-positions of the cells in this modification, the knobs 23 and 24 may be provided with suitable arresting means such as snap springs engaging depressions in the casing or body of the camera or any other suitable limiting or stop means may be provided. In place of mounting the cells within recesses they may be protected against lateral light rays by side walls projecting from the walls of the chamber 20 as is readily understood.

The adjustment of the cells to and from their operative position will be further described in the following: As one of the cells 17 or 18 is swung from its ineffective or resting position to its operative position by turning the corresponding adjusting knob 23 or 24, the cell or its holder will turn the cover in the opposite direction about its pivotal axis against the action of the springs 26 and 27, thereby tensioning the latter in such a manner that, when the free end of the cell leaves the free end of the cover, the latter will return to its original position, thus allowing the rotation of the cell to be continued until reaching the operative position as shown for the cell 17 in Figure 2. In this position, the cell is held and prevented from returning to its resting position due to its own weight or other forces affecting same by the free end of the cover acting as a stop or abutment for the cell as clearly seen from the drawing. During the return movement, when the cell is swung in the opposite direction, the free edge of the cover will glide along the cell holder, thereby lifting and rotating the former about its hinge or pivotal axis, until the free edge of the cell passes the free edge of the cover, whereupon the latter will reverse its movement and follow the cell, due to the action of the springs 26 and 27 until reaching the original position in which the cover completely protects and conceals the cell. In order to prevent jamming and to afford a smooth start at the initiation of the return movement, the free edge of the cover is suitably rounded or otherwise shaped such as by the provision of trough-shaped gliding shoes or extensions as shown at 28 and 29, respectively.

It will be evident from the foregoing that by the employment of a selective photocell mount embodied in a photographic camera, in the manner described, it is possible to provide a plurality of photoelectric cells permanently built in a camera in normally concealed and ineffective position so as not to interfere with the proper function of the camera, while being able to be instantly selected and swung into operative position for carrying out a light measurement or exposure determination, greatly increasing thereby the scope and possibilities of the camera to suit numerous special requirements in photographic exposure determination.

Since the photoelectric cells in their ineffective or non-use position are concealed and protected from the light rays passing through the exposure chamber of the camera, they may all be permanently connected in parallel to the indicating instrument or microammeter as shown in the wiring diagram of Figure 5. Only one of the cells may be in operative position at a time while the remaining cells are fully concealed and protected from the light rays passing through the camera chamber, and hence the meter will indicate or measure the correct scene or object brightness without being affected by the remaining cells as is readily understood. However, the cells may be separately connected with and disconnected from the microammeter by the provision of suitable switching elements associated with the adjusting members. In Figure 5, four cells 17, 18, 45 and 46 are shown which may be mounted upon the four walls of the light chamber and may have a different sensitivity or effective size as shown at 17', 18', 45' and 46', respectively. The cells are adjustable to and from the operative position from the outside of the camera by means of adjusting knobs 23, 24, 47 and 48, respectively, and may serve to take into account various exposure determining conditions or factors such as different film or plate speeds, or to differentiate between portions of a scene or object, or in general to consider any desired and variable physical or pictorial picture taking requirement.

It will be evident from the foregoing that the invention is not limited to the specific constructions and arrangements of parts and details shown herein for illustration, but that the basic principle and underlying thought will be susceptible of numerous modifications and variations coming within the broader scope and spirit of the invention as defined by the appended claims.

The specification and drawings are, therefore, to be regarded in an illustrative rather than in a limiting sense.

I claim:

1. The combination with a photographic camera having a lens, a picture frame and a light chamber connecting said lens with said picture frame, of at least one photoelectric cell hingedly secured to a wall of said chamber adjacent to said picture frame so as to lie against said wall in the non-use position and adapted to be swung into operative position in front of said picture frame, adjusting means for said photoelectric cell operable from the outside of said camera, a cover member hingedly connected to said wall to rest against and conceal said cell in the non-use position and spring means arranged to urge said cover member against said cell and adapted to allow said cover member to be lifted and returned to its resting position when said cell is moved from its non-operative to its operative position and vice-versa, and an electric measuring instrument built in said camera and electrically connected to said cell.

2. The combination with a photographic camera comprising a lens, a picture frame and a light chamber connecting said lens with said picture frame, of at least one photoelectric cell hingedly connected to a wall of said chamber so as to rest against said wall in the non-use position and adapted to be swung into operative position substantially at right angle to the light bundle passing said lens and chamber, adjusting means for said cell operable from the outside of said camera, and a current responsive device built in said camera and electrically connected to said cell, the combination including a view finder having a field corresponding to said picture frame, said cell having an effective area less than the area of said picture frame and means to identify an area in said finder corresponding both in relative size and position to the area of said cell relative to said picture frame.

3. The combination with a photographic camera having a lens, a picture frame and a light chamber connecting said lens with said picture frame, of a plurality of photoelectric cells hingedly connected to the walls of said chamber at the side of said picture so as to rest against said walls in the non-use position and adapted to be selectively swung into operative position in front of said picture frame, adjusting means for said photoelectric cells operable from the outside of said camera, an electrical measuring instrument built in said camera, and circuit connection for connecting said photoelectric cells in parallel to said instrument.

4. The combination with a photographic camera having a lens, a picture frame and a light chamber connecting said lens with said picture frame, of a plurality of photoelectric cells hingedly connected to the walls of said chamber at the side of said picture frame so as to rest against said walls in the non-use position and adapted to be selectively swung into operative position in front of said picture frame, adjusting means for said photoelectric cells operable from the outside of said camera, a plurality of cover members hingedly connected to said walls to conceal said cells in the non-use position and adapted to be lifted about their pivotal axes to allow said cells to be moved to and from their operative positions, an electrical measuring instrument built in said camera, and circuit connections for connecting said photoelectric cells in parallel to said instrument.

5. The combination with a photographic camera having a lens, a picture frame and a light chamber connecting said lens with said picture frame, of a plurality of photoelectric cells hingedly connected to the walls of said chamber at the side of said picture frame so as to rest against said walls in the non-use position and adapted to be selectively swung into operative position in front of said picture frame, adjusting means for said photoelectric cells operable from the outside of said camera, an electrical measuring instrument built in said camera, circuit connections for connecting said photoelectric cells in parallel to said instrument, a view finder for said camera having a field substantially corresponding to the field covered by said picture frame, at least one of said photoelectric cells having an effective area covering a fractional area of the picture field, means to identify a partial area in said finder corresponding in relative size and position to the area of said cell relative to said picture frame, and another of said photoelectric cells having an effective area substantially equal to the area covered by said picture frame.

6. The combination with a photographic camera having a lens, a picture frame and a light chamber connecting said lens with said picture frame, of at least one photoelectric cell having a holder hingedly connected to a wall of said chamber so as to rest against said wall in the non-use position and adapted to be swung into operative position substantially at right angle to the light bundle entering said lens and passing through said chamber, a protective cover overlying said cell also being hinged to said wall opposite to the hinge of said holder, spring means urging said cover towards said wall, the hinges of said holder and cover being spaced by a distance slightly greater than the holder and cover extend from their hinges to allow said cover to ride on one side of the holder when the latter is first swung towards its operative position and to allow said cover to ride on the other side of said holder and return to its resting position upon said wall after the free edge of said holder has passed the free edge of said cover.

7. The combination with a photographic camera having a lens, a picture frame and a light chamber connecting said lens with said picture frame, of at least one photoelectric cell having a holder hingedly connected to a wall of said chamber so as to rest against said wall in the non-use position and adapted to be swung into operative position substantially at right angle to the light bundle entering said lens and passing through said chamber, a protective cover overlying said cell also being hinged to said wall opposite to the hinge of said holder, spring means urging said cover towards said wall, the hinges of said holder and cover being spaced by a distance slightly greater than the holder and cover extend from their hinges to allow said cover to ride on one side of the holder when the latter is first swung towards its operative position and to allow said cover to ride on the other side of said holder and return to its resting position upon said wall after the free edge of said holder has passed the free edge of said cover, the free end of said cover forming a stop for said holder in the operative position and being adapted to readily glide upon said holder at the initiation of a return movement of said holder from its operative to its non-use position.

8. The combination with a photographic camera having a lens, a picture frame and a light chamber connecting said lens with said picture frame, of a plurality of photoelectric cells having holders hingedly connected to separate walls of said chamber so as to rest against said walls in the non-use positions and adapted to be selectively swung into operative position substantially at right angle to the light bundle entering said lens and passing through said chamber, protective covers overlying said cells and also being hinged to said walls opposite to the hinges of the respective holders, spring means urging said covers towards said walls, the hinges of the holders and covers being spaced by a distance slightly greater than the holders and covers extend from their hinges to allow said covers to ride on one side of the respective holder when the latter is first swung towards its operative position and to allow said covers to ride on the other side of said holders and return to their resting position upon said walls after the free edges of the holders have passed the free edges of said covers.

9. The combination with a photographic camera having a lens, a picture frame and a light chamber connecting said lens with said picture frame, of a plurality of photoelectric cells having holders hingedly connected to separate walls of said chamber so as to rest against said walls in the non-use positions and adapted to be selectively swung into operative position substantially at right angle to the light bundle entering said lens and passing through said chamber, protective covers overlying said cells and also being hinged to said walls opposite to the hinges of the respective holders, spring means urging said covers towards said walls, the hinges of the holders and covers being spaced by a distance slightly greater than the holders and covers extend from their hinges to allow said covers to ride on one side of the respective holder when the latter is first swung towards its operative position and to allow said covers to ride on the other side of said holders and return to their resting position upon said walls after the free edges of the holders have passed the free edges of said covers, the free ends of said covers forming stops for said holders in the operative position and being adapted to readily glide upon said holders at the initiation of a return movement of said holders from their operative to their non-use position.

JOSEPH M. BING.